US009685111B2

(12) United States Patent
Choi

(10) Patent No.: US 9,685,111 B2
(45) Date of Patent: Jun. 20, 2017

(54) DISPLAY DEVICE, CONTROL DEVICE FOR DRIVING THE DISPLAY DEVICE, AND CONTROL METHOD THEREOF

(71) Applicant: SAMSUNG DISPLAY CO., LTD., Yongin, Gyeonggi-Do (KR)

(72) Inventor: Hak-Ki Choi, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 65 days.

(21) Appl. No.: 14/270,397

(22) Filed: May 6, 2014

(65) Prior Publication Data

US 2014/0333603 A1 Nov. 13, 2014

(30) Foreign Application Priority Data

May 10, 2013 (KR) ........................ 10-2013-0053219

(51) Int. Cl.
*G06F 3/038* (2013.01)
*G09G 5/00* (2006.01)
*G09G 3/3233* (2016.01)

(52) U.S. Cl.
CPC ..... *G09G 3/3233* (2013.01); *G09G 2330/025* (2013.01); *G09G 2330/10* (2013.01); *G09G 2330/12* (2013.01)

(58) Field of Classification Search
CPC .......... G09G 3/3258; G09G 2330/00–2330/12
See application file for complete search history.

(56) References Cited

U.S. PATENT DOCUMENTS 6,674,404 B1 * 1/2004 Lee ........................ H04N 5/367 348/275
7,960,917 B2 * 6/2011 Kimura .................... G09G 3/14 315/169.3
2005/0052350 A1 * 3/2005 Mizukoshi ........... G09G 3/3233 345/55
2006/0055631 A1 * 3/2006 Yoshida ............... G09G 3/3233 345/46
2006/0290645 A1 * 12/2006 Jeon ......................... G09G 3/22 345/100
2007/0164937 A1 * 7/2007 Jung .................... G09G 3/3233 345/76
2007/0229415 A1 * 10/2007 Kasai .................. G09G 3/3233 345/77

(Continued)

FOREIGN PATENT DOCUMENTS

KR 10-2012-0026706 A 3/2012
KR 10-2012-0128815 A 11/2012

*Primary Examiner* — Amare Mengistu
*Assistant Examiner* — Crystal A Mathews
(74) *Attorney, Agent, or Firm* — Lee & Morse P.C.

(57) ABSTRACT

Provided is a display device, including: a display unit including a plurality of pixels that emit light according to a plurality of data signals supplied through a plurality of data lines; a power voltage supplier configured to supply a power voltage to the plurality of pixels; a current detector configured to detect a total current flowing in the plurality of pixels; and a controller configured to receive image information of one frame unit and generate a reference voltage signal corresponding to the image information of one frame unit. The current detector compares the total current and the reference voltage signal and controls driving of the power voltage supplier according to the comparison.

21 Claims, 7 Drawing Sheets

(56) References Cited

U.S. PATENT DOCUMENTS

2008/0055211 A1* 3/2008 Ogawa ................. G09G 3/3225 345/77
2008/0122758 A1* 5/2008 Kim ..................... G09G 3/3216 345/76
2008/0180367 A1* 7/2008 Lee ...................... G09G 3/3225 345/80
2008/0291136 A1* 11/2008 Inoue ................... G09G 3/2014 345/76
2009/0195484 A1* 8/2009 Lee ...................... G09G 3/3216 345/76
2009/0201281 A1* 8/2009 Routley ............... G09G 3/3233 345/212
2009/0207160 A1* 8/2009 Shirasaki ............. G09G 3/3233 345/212
2011/0007435 A1* 1/2011 Dong ...................... H02M 1/32 361/18
2012/0019506 A1* 1/2012 Hekstra ................ G09G 3/3233 345/212
2012/0044270 A1* 2/2012 Arkhipov ................. G09G 3/32 345/690
2012/0050249 A1* 3/2012 Jin ........................... G09G 3/20 345/212
2012/0256897 A1* 10/2012 Seo ........................ G09G 3/006 345/212
2012/0293562 A1* 11/2012 Park ..................... G09G 3/3233 345/690
2013/0002736 A1* 1/2013 Park ..................... G09G 3/3225 345/691
2013/0016310 A1* 1/2013 Kanemitsu ......... H05B 33/0818 349/69
2013/0113773 A1* 5/2013 Lee .................... H05B 33/0815 345/211
2013/0278586 A1* 10/2013 Kawano ................. G09G 5/001 345/212
2014/0104258 A1* 4/2014 Oh ....................... G09G 3/3291 345/211

* cited by examiner

FIG. 4

| Data load ratio of image information(%) | 0 | 10 | 20 | 30 | 40 | 50 | 60 | 70 | 80 | 90 | 100 |
|---|---|---|---|---|---|---|---|---|---|---|---|
| Second voltage(V) | 0.3 | 0.5 | 0.7 | 1.0 | 1.0 | 1.0 | 1.0 | 1.0 | 1.0 | 1.0 | 1.0 |

FIG. 6

| | | | | | | | | | | | |
|---|---|---|---|---|---|---|---|---|---|---|---|
| Data load ratio of image information(%) | 0 | 10 | 20 | 30 | 40 | 50 | 60 | 70 | 80 | 90 | 100 |
| PWM pulse duty of reference voltage signal(%) | 0 | 10 | 20 | 30 | 40 | 50 | 60 | 70 | 80 | 90 | 100 |
| Second voltage(V) | 0.3 | 0.5 | 0.7 | 1.0 | 1.0 | 1.0 | 1.0 | 1.0 | 1.0 | 1.0 | 1.0 |

DISPLAY DEVICE, CONTROL DEVICE FOR DRIVING THE DISPLAY DEVICE, AND CONTROL METHOD THEREOF

CROSS-REFERENCE TO RELATED APPLICATION

Korean Patent Application No. 10-2013-0053219, filed on May 15, 2013, in the Korean Intellectual Property Office, and entitled: "Display Device, Control Device For Driving the Display Device, and Control Method Thereof," is incorporated by reference herein in its entirety.

BACKGROUND

1. Field

Embodiments relate to a display device, a control device for driving a display device, and a control method thereof.

2. Description of the Related Art

An organic light emitting diode display among flat panel displays uses an organic light emitting diode, which generates light by recoupling electrons and holes to display an image. Since the organic light emitting diode display has a fast response speed, low power consumption, excellent luminous efficiency, excellent luminance, and a wide viewing angle, the organic light emitting diode display has received attention.

In general, the organic light emitting diode display is classified into a passive matrix organic light emitting diode (PMOLED) display and an active matrix organic light emitting diode (AMOLED) display according to a driving mode of the organic light emitting diode.

The passive matrix type is a driving mode in which an anode and a cathode are perpendicular to each other and a cathode line and an anode line are selected. The active matrix type is a driving mode in which a thin film transistor and a capacitor are in each pixel and a voltage is maintained by capacitance. The passive matrix type has a simple structure and a low price, but it is difficult to implement a large or high-precision panel. On the other hand, the active matrix type may be used in a large and/or high-precision panel, but a control method thereof is technically difficult and relatively expensive.

From the viewpoint of resolution, contrast, and operation speed, the AMOLED display which emits light selected for each unit pixel has become mainstream. In one pixel of the active matrix OLED display (hereinafter, referred to as an organic light emitting diode display), a light emission degree of the organic light emitting diode is controlled by controlling a driving transistor which supplies a driving current according to a data voltage to the organic light emitting diode. A value of the current flowing in the pixel is changed depending on a characteristic of an element configuring a pixel and a voltage applied to the pixel. In addition, when the value of the current flowing in the pixel exceeds a limiting current value, the application of the voltage supplied to the pixel stops and thus the display device is protected.

However, when the pixel has a defect or a fault, an abnormal current having a current value of the limiting current value or less flows and thus there is a problem in that the display device may not be protected.

The above information disclosed in this Background section is only for enhancement of understanding of the disclosure and therefore it may contain information that does not form the prior art that is already known in this country to a person of ordinary skill in the art.

SUMMARY

An exemplary embodiment provides a display device, including: a display unit including a plurality of pixels which emits light according to a plurality of data signals supplied through a plurality of data lines, a power voltage supplier configured to supply a power voltage to the plurality of pixels, a current detector configured to detect a total current flowing in the plurality of pixels, and a controller configured to receive image information of one frame unit and generate a reference voltage signal corresponding to the image information of one frame unit, in which the current detector compares the total current and the reference voltage signal and controls driving of the power voltage supplier according to the comparison.

The controller may determine a data load ratio of the image information of one frame unit by a ratio of a sum of maximum currents flowing in the plurality of pixels and a sum of currents flowing in the plurality of pixels by the image information of one frame unit, and generate the reference voltage signal according to the determined data load ratio.

The current detector may include a current-voltage converter configured to convert the total current into a first voltage, a signal converter configured to convert a digital signal of the reference voltage signal into an analog signal having a second voltage value, and a comparator configured to compare the first voltage value and the second voltage value and to output a signal stopping driving of the power voltage supplier when the first voltage exceeds the second voltage.

The current detector may include a current-voltage converter configured to convert the total current into a first voltage, a filter configured to output the reference voltage signal in a predetermined frequency section to a second voltage, and a comparator configured to compare the first voltage value and the output second voltage value and to output a signal stopping driving of the power voltage supplier when the first voltage exceeds the second voltage.

The controller may generate the reference voltage signal having a duty ratio changed according to the data load ratio.

The controller may determine the data load ratio as a plurality of sections, and when the determined data load ratio corresponds to a first section, the controller may generate the reference voltage signal so that the second voltage corresponding to the first section is output to the comparator The currents flowing in the plurality of pixels may be a sum of currents flowing in the plurality of pixels.

Another exemplary embodiment provides a driving control device for controlling driving of a power voltage supplier which supplies a power voltage to a plurality of pixels through a power wire connected to the plurality of pixels emitting light according to a plurality of data signals supplied through a plurality of data lines, the device including: a current detector configured to detect a total current flowing in the plurality of pixels, and control driving of the power voltage supplier according to a result acquired by comparing the total current and a reference voltage signal corresponding to image information of one frame.

Yet another exemplary embodiment provides a control method of a display device, including: detecting a total current flowing in a plurality of pixels, receiving image information of one frame unit; generating a reference voltage signal corresponding to the image information of one frame unit; and stopping driving of a power voltage supplier which supplies a power voltage to the plurality of pixels according to a result acquired by comparing the total current and the generated reference voltage signal.

BRIEF DESCRIPTION OF THE DRAWINGS

Features will become apparent to those of ordinary skill in the art by describing in detail exemplary embodiments with reference to the attached drawings in which:

FIG. 4 illustrates a table of a relationship between a data load ratio of image information and a second voltage depending on a control method according to an exemplary embodiment.

FIG. 6 illustrates a table of a relationship among a data load ratio of image information, a duty ratio of a reference voltage signal, and a second voltage depending on a control method of the display device according to the exemplary embodiment of FIG. 5.

DETAILED DESCRIPTION

Figure 1:
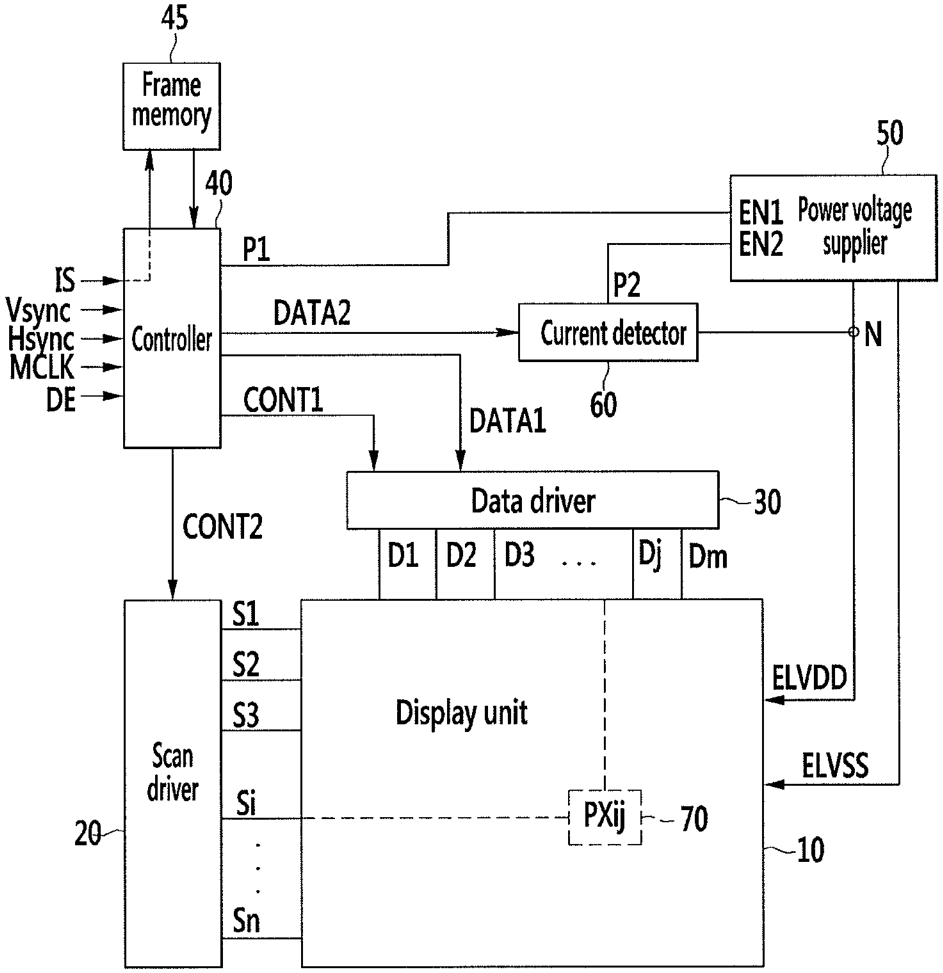
FIG. 1 illustrates a block diagram of a schematic configuration of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 illustrates a block diagram of a schematic configuration of a display device according to an exemplary embodiment. Referring to FIG. 1, the display device includes a display unit 10 including a plurality of pixels 70, a scan driver 20, a data driver 30, a controller 40, a power voltage supplier 50, and a current detector 60.

The display unit 10 is a display panel including a plurality of pixels 70 connected to corresponding scan lines among a plurality of scan lines S1-Sn and corresponding data lines among a plurality of data lines D1-Dm. Each of the plurality of pixels responds to an image data signal transferred to the corresponding pixel to display an image.

Each of the plurality of pixels included in the display unit 10 is connected to the plurality of scan lines S1-Sn and the plurality of data lines D1-Dm to be arranged substantially in a matrix. The plurality of scan lines S1-Sn extends substantially in a row direction to be almost parallel to each other. The plurality of data lines D1-Dm extends in a substantially column direction to be almost parallel to each other. Each of the plurality of pixels of the display unit 10 receives a power voltage from the power voltage supplier 50 to receive a first driving voltage ELVDD and a second driving voltage ELVSS.

The scan driver 20 is connected to the display unit 10 through the plurality of scan lines S1-Sn. The scan driver 20 generates a plurality of scan signals capable of activating each pixel of the display unit 10 according to a scan control signal CONT2 to transfer the generated scan signal to the corresponding scan line among the plurality of scan lines S1-Sn.

The scan control signal CONT2 is an operation control signal of the scan driver 20 which is generated and transferred from the controller 40. The scan control signal CONT2 may include a scan start signal SSP, a clock signal CLK, and the like. The scan start signal SSP is a signal generating a first scan signal for displaying an image for one frame. The clock signal CLK is a synchronization signal for sequentially applying a scan signal to the plurality of scan lines S1-Sn.

The data driver 30 is connected with each pixel of the display unit 10 through the plurality of data lines D1-Dm. The data driver 30 receives an image data signal DATA1 to transfer the received image data signal DATA1 to a corresponding data line among the plurality of data lines D1-Dm according to a data control signal CONT1.

The data control signal CONT1 is an operation control signal of the data driver 30 which is generated and transferred from the controller 40.

The data driver 30 selects a gray voltage according to the image data signal DATA1 to transfer the selected gray voltage to the plurality of data lines D1-Dm as a data signal.

The controller 40 receives image information IS input from the outside, and an input control signal controlling a display of the image information IS. The image information IS stores luminance information of each pixel PX of the display unit 10. Luminance information may be classified into a predetermined number of gray levels, for example, 1024 ($=2^{10}$), 256 ($=2^8$), or 64 ($=2^6$) gray levels.

An example of the input control signal transferred to the controller 40 includes a vertical synchronization signal Vsync, a horizontal synchronizing signal Hsync, a main clock MCLK, a data enable signal DE, and the like.

The controller 40 appropriately image-processes the input image information IS based on the input image information IS and the input control signal in accordance with an operation condition of the display unit 10 and the data driver 30. In detail, the controller 40 generates the image data signal DATA1 through image processing processes, e.g., gamma correction, luminance compensation, and the like, with respect to the image information IS.

Further, the controller 40 transfers a scan control signal CONT2 controlling an operation of the scan driver 20 to the scan driver 20. The controller 40 generates the data control signal CONT1 controlling an operation of the data driver 30 and transfers, to the data driver 30, the generated data control signal CONT1 together with the image data signal DATA1 through the image processing process.

In addition, the controller 40 may store the input image information IS in a frame memory 45. The frame memory 45 may output the stored image information to the controller 40 again, and the controller 40 may determine a data load ratio of the output image information of one frame unit. In this case, the frame memory 45 may be included in the controller 40.

The data load ratio may be determined depending on the number of pixels emitting light and a gray level of each pixel emitting light according to the image information of one frame unit.

For example, the data load ratio may be a ratio of the number of pixels emitting light and the gray level of each pixel emitting light according to image information of one frame unit which is currently received based on a load when all of the plurality of pixels emits light at a maximum gray level.

As another example, the data load ratio may be a ratio of the sum of a total current flowing when all of the pixels of the display unit 10 emit light by the image information of one frame unit based on the sum of a total current flowing in the display unit 10 when all of the pixels of the display unit 10 emit light at a maximum gray level.

The controller 40 may generate a reference voltage signal DATA2 corresponding to the data load ratio of the determined image information of one frame unit. In this case, the reference voltage signal DATA2 generated according to the data load ratio will be described below with reference to FIGS. 4 and 6.

Next, the controller 40 may control driving of the power voltage supplier 50. The power voltage supplier 50 supplies a power voltage for driving each pixel of the display unit 10.

For example, the controller 40 is connected with the power voltage supplier 50 and a driving terminal EN1 to transfer a driving signal P1 to the power voltage supplier 50 and drive the power voltage supplier 50.

Next, the power voltage supplier 50 is electrically connected with each pixel through a power wire supplying the power voltage to each pixel of the display unit 10. The power voltage may be the first power voltage ELVDD and the second power voltage ELVSS at a high level.

The current detector 60 may detect a current flowing in the power wire 52 which transfers the first power voltage ELVDD to the display unit 10 from the power voltage supplier 50.

As an example, the current detector 60 may directly measure a current flowing in the power wire 52 by using a resistor formed in the power wire 52. As another example, the current detector 60 may measure a current flowing in the power wire 52 by using a hall sensor. A mechanism by which the current detector 60 detects the current flowing in the power wire 52 is not limited to the above examples.

The current detector 60 determines a total sum (hereinafter, a total current) of currents flowing in the plurality of pixels through the power wire.

When a defect is generated in the pixel, the current flowing in the pixel having the defect may be larger than a current flowing in a pixel operating normally. Since the current detector 60 detects the current flowing in the power wire 52, the current detector 60 may detect the total current flowing in the pixel operating normally and the pixel having the defect.

In addition, the current detector 60 may generate a driving signal P2 controlling driving of the power voltage supplier 50, according to a result acquired by comparing the detected current and the reference voltage signal DATA2 received from the controller 40. The current detector 60 outputs the generated driving signal P2 to the power voltage supplier 50 to control driving of the power voltage supplier 50.

For example, the current detector 60 is connected with a driving terminal EN2 of the power voltage supplier 50 to transfer the driving signal P2 to the power voltage supplier 50 and drive the power voltage supplier 50. In this case, the power voltage supplier 50 may be driven only when both the driving signal P1 and the driving signal P2 are received.

A detailed configuration of the current detector 60 according to the exemplary embodiment will be described below in the drawings.

Figure 2:
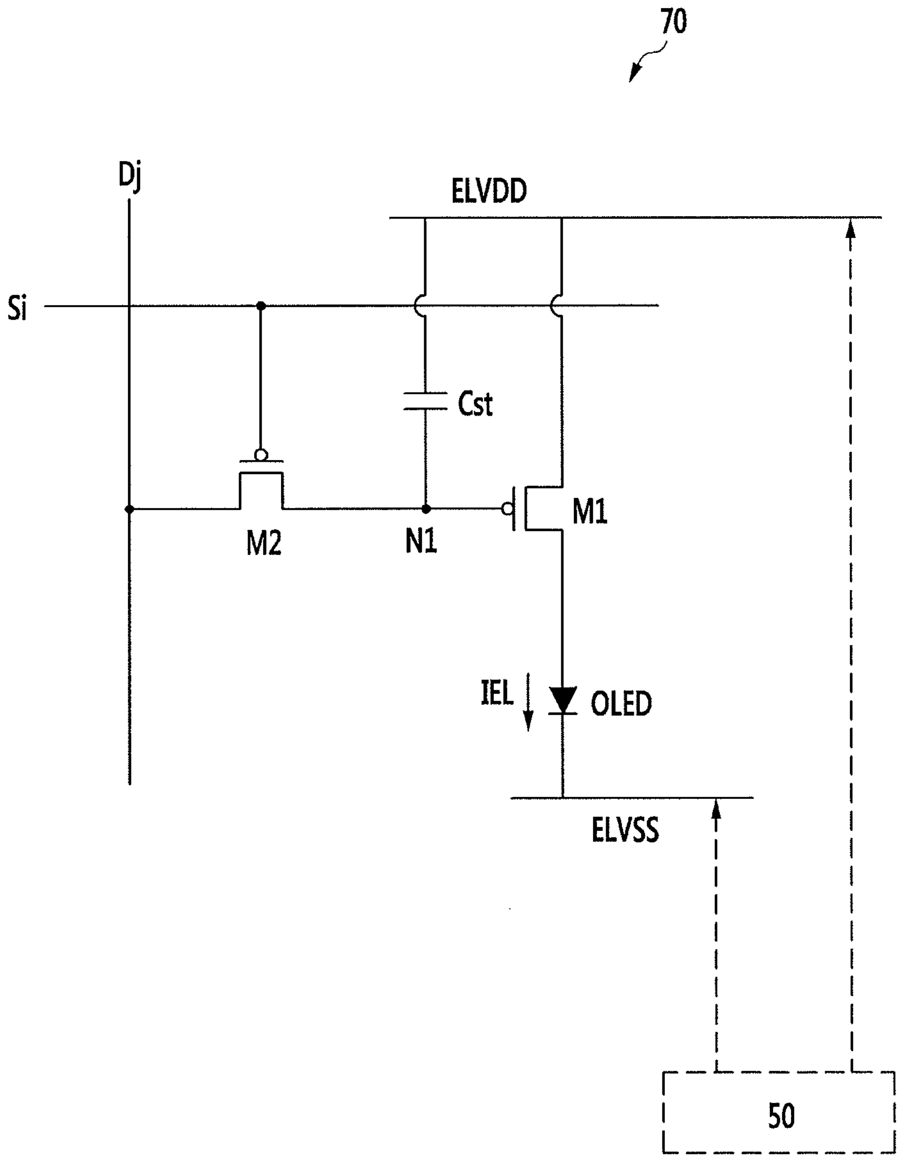
FIG. 2 illustrates a circuit diagram of an example of a pixel structure included in a display unit of the display device according to the exemplary embodiment of FIG. 1.

FIG. 2 illustrates a circuit diagram of an example of a pixel structure included in a display unit 10 of the display device according to the exemplary embodiment of FIG. 1. In detail, as a pixel illustrated in an area where an i-th scan line Si and a j-th data line Dj cross each other among the plurality of pixels included in the display unit 10 of FIG. 1, a structure of a pixel PXij 70 connected to the i-th scan line Si and the j-th data line Dj is illustrated.

Referring to FIG. 2, the pixel 70 includes an organic light emitting diode (OLED) as an organic light emitting element and a pixel driving circuit for controlling the organic light emitting diode (OLED. The pixel driving circuit includes a driving transistor M1, a switching transistor M2, and a storage capacitor Cst.

FIG. 2 representatively illustrates the pixel structure which is configured by two transistors and one capacitor, but the pixel circuit structure of the display device is not limited to this structure and may be variously configured.

In the pixel 70 of FIG. 2, the driving transistor M1 includes a gate electrode connected to a drain electrode of a switching transistor M2, a source electrode receiving a first power voltage ELVDD, and a drain electrode connected to an anode of the organic light emitting diode (OLED).

The first power voltage ELVDD is supplied to the source electrode of the driving transistor M1 through the power wire 52 connected to the power voltage supplier 50 as described in FIG. 1.

The switching transistor M2 includes a gate electrode connected to the scan line Si, a source electrode connected to the data line Dj, and a drain electrode connected to the gate electrode of the driving transistor M1.

The storage capacitor Cst includes a first electrode connected to the gate electrode of the driving transistor M1, and a second electrode connected to a contact point of the first power voltage ELVDD and the source electrode of the driving transistor M1. The storage capacitor Cst is charged by a data voltage according to a data signal applied to the gate electrode of the driving transistor M1. The voltage charged in the storage capacitor Cst is maintained until the switching transistor M2 is turned on again and then a new data signal is transferred.

The organic light emitting diode (OLED) includes an anode connected to the drain electrode of the driving transistor M1 and a cathode connected to the second power voltage ELVSS. The second power voltage ELVSS is supplied to the cathode of the organic light emitting diode (OLED) through the power wire 52 connected to the power voltage supplier 50 as described in FIG. 1.

The driving transistor M1 and the switching transistor M2 configuring the pixel of FIG. 2 may be p-channel type transistors. Accordingly, a gate on voltage turning on the driving transistor M1 and the switching transistor M2 is a low level voltage, and a gate off voltage turning off the driving transistor M1 and the switching transistor M2 is a high level voltage. The pixel illustrated in FIG. 2 includes a p-channel type thin film transistor, but the exemplary embodiment is not limited thereto. At least one of the driving transistor and the switching transistor may be an n-channel transistor.

The organic light emitting diode (OLED) emits light according to a driving current IEL.

Describing the operation of the pixel circuit of FIG. 2, first, when a scan signal corresponding to the gate on voltage is transferred to the scan line Si, the switching transistor M2 is turned on, and a voltage (hereinafter, a data voltage) according to a corresponding data signal is transferred to the first node N1 through the data line Dj.

Then, the data voltage is applied to one electrode of the storage capacitor Cst connected to the first node N1, the first power voltage ELVDD is applied to the other electrode of the storage capacitor Cst, and the storage capacitor Cst is charged with a voltage corresponding to a difference of the voltages between both electrodes.

That is, since the difference between the voltages applied to both electrodes of the storage capacitor Cst corresponds to a difference between the voltages applied to the gate electrode and the source electrode of the driving transistor M1, the storage capacitor Cst stores a voltage Vgs between the gate electrode and the source electrode of the driving transistor M1.

The driving transistor M1 controls the driving current IEL according to the voltage Vgs between the gate electrode and the source electrode. Next, the current detector 60 controlling the reference voltage signal DATA2 and driving of the power voltage supplier 50 will be described in detail with reference to FIGS. 3 to 5. In this case, the current detector 60 and the controller 40 may operate as a driving control device of the power voltage supplier 50.

Figure 3:
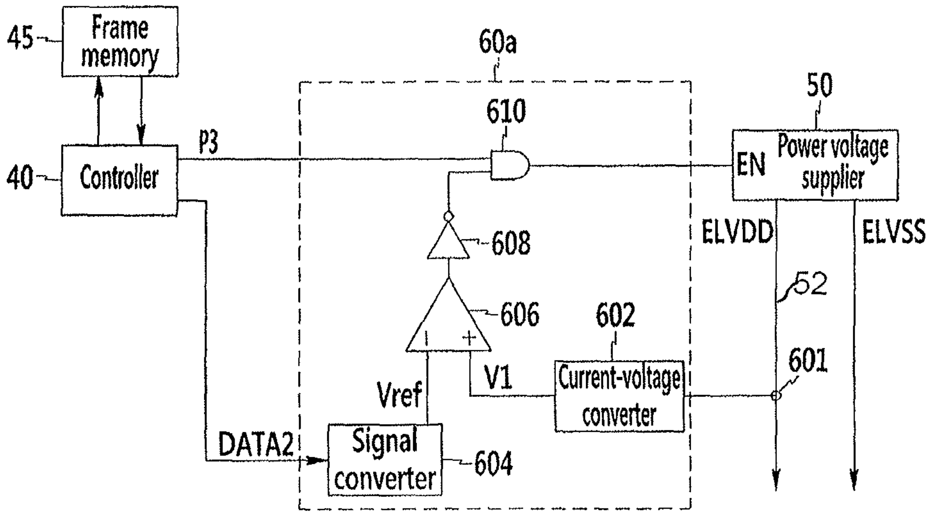
FIG. 3 illustrates a block diagram of a driving control device of the display device according to a first exemplary embodiment in detail.
Figure 5:
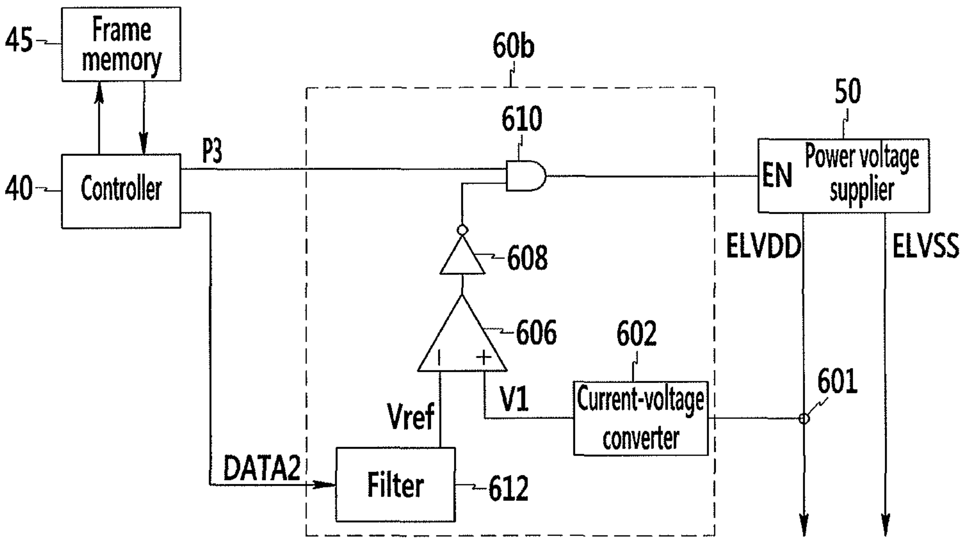
FIG. 5 illustrates a block diagram of a control device for driving a display device according to a second exemplary embodiment in detail.

The current detector 60 and the display device are not limited to the configuration illustrated in FIGS. 3 and 5, and each configuration may be easily replaced by those skilled in the art.

FIG. 3 illustrates a block diagram of a driving control device of the display device according to a first exemplary embodiment in detail. As illustrated therein, a current detector 60*a* may include a current detecting sensor 601, a current voltage converter 602, a signal converter 604, a comparator 606, and logic gates 608 and 610.

First, the current detecting sensor 601 may detect a current flowing in the power wire 52 which transfers the first power voltage ELVDD to the display unit 10 from the power voltage supplier 50. In this case, the measured current is a total current flowing in a pixel operating normally in the display unit 10 and a pixel having a defect.

Then, the current voltage converter 602 may convert the measured current into a voltage. For example, the voltage may be converted in proportion to a measured voltage value.

In addition, the current voltage converter 602 is connected to a non-inversion terminal (+) of the comparator 606 to transfer the converted voltage to the comparator 606. The voltage converted by the current voltage converter 602 is assumed as a first voltage V1 to be described.

Meanwhile, the signal converter 604 receives the reference voltage signal DATA2 output from the controller 40 to convert the received reference voltage signal DATA2 into a voltage. In this case, when the reference voltage signal DATA2 is input as a digital signal, the signal converter 604 converts the digital signal into an analog voltage signal to generate a second voltage Vref.

Since the second voltage Vref is converted according to the reference voltage signal DATA2 generated by the data load ratio, the second voltage Vref may depend on the data load ratio of the image information. The second voltage Vref output according to the data load ratio is illustrated in a table of FIG. 4.

FIG. 4 illustrates a table of a relationship between a data load ratio of image information and a second voltage Vref depending on a control method according to an exemplary embodiment. Referring to FIG. 4, the second voltage Vref output from the signal converter 604 is changed according to the data load ratio of the image information determined in the controller 40.

For example, when the data load ratio of the image information is 12%, the controller 40 determines that the data load ratio of 12% corresponds to a section of a data load ratio of 10%, and may output the corresponding reference voltage signal DATA2 to the signal converter 604. Then, the signal converter 604 converts the input reference voltage signal DATA2 into a second voltage Vref of 0.5 V to transfer the converted second voltage Vref to the comparator 606.

When the data load ratio of the image information is 20%, the controller 40 may output the reference voltage signal DATA2 corresponding to the data load ratio of 20% to the signal converter 604. Then, the signal converter 604 transfers a voltage Vref having a value of 0.7 V to the comparator 606 according to the input reference voltage signal DATA2.

When the data load ratio of the image information is 30% or more, the controller 40 may output a predetermined reference voltage signal DATA2 to the signal converter 604. The signal converter 604 transfers a voltage Vref having a value of 1V to the comparator 606 according to the input reference voltage signal DATA2.

The second voltage Vref is applied to an inversion terminal (−) of the comparator 606, and the comparator 606 compares the first voltage V1 and the second voltage Vref. When the first voltage V1 is larger than the second voltage Vref, the comparator 606 outputs a high signal. When the second voltage Vref is larger than the first voltage V1, the comparator 606 outputs a low signal. The output of the comparator 606 is inverted by an inverter 608 to be output to an AND gate 610.

The AND gate 610 receives the output of the inverter 608 and a driving signal P3 of the controller 40, and generates an output according to a result acquired by performing an AND operation of two inputs. The output of the AND gate 610 may be connected with a driving terminal EN of the power voltage supplier 50. Only when two input signals are high signals does the AND gate 610 output a high signal to the power voltage supplier 50.

Even if a high signal is received from the controller 40, when a low signal is received from the inverter 608, the AND gate 610 outputs a low signal to the power voltage supplier 50. In response to a low signal, driving of the power voltage supplier 50 may stop.

FIG. 5 illustrates a block diagram of a control device for driving a display device according to a second exemplary embodiment in detail. As illustrated in FIG. 5, a current detector 60*b* may include the current detecting sensor 601, the current voltage converter 602, a filter 612, the comparator 606, and logic gates 608 and 610.

The current detecting sensor 601, the current voltage converter 602, comparator 606, and the logic gates 608 and 610 are the same as described in FIG. 3.

In this case, the controller 40 may generate reference voltage signals DATA2 of PWM waveforms which have different duty ratios according to a data load ratio of image information.

Meanwhile, when the reference voltage signal DATA2 is input from the controller 40, the filter 612 may output the reference voltage signal DATA2 in a predetermined frequency section as a voltage. The voltage output by the filter 612 according to the reference voltage signal DATA2 is assumed as a second voltage Vref to be described.

Since the second voltage Vref is output according to the reference voltage signal DATA2 generated by the data load ratio, the second voltage Vref may be in proportion to the data load ratio of the image information. The second voltage Vref output depending on the data load ratio is illustrated in a table of FIG. 6.

FIG. 6 illustrates a table of a relationship between a data load ratio of image information, a duty ratio of a reference voltage signal DATA2, and a second voltage Vref depending on a control method according to the exemplary embodiment.

Referring to FIG. 6, the controller 40 generates the reference voltage signal DATA2 so as to vary a duty ratio of the reference voltage signal DATA2 so that the second voltage Vref output from the filter 612 is changed according to the determined data load ratio of the image information.

For example, when the data load ratio of the image information is 12%, the controller 40 determines that the data load ratio of 12% corresponds to a section of a data load ratio of 10%, and may output the corresponding reference voltage signal DATA2 having a duty ratio of 12% to the filter 612. Then, the filter 612 transfers a second voltage Vref having a value of 0.5 V to the comparator 606 according to the input reference voltage signal DATA2.

When the data load ratio of the image information is 20%, the controller 40 may output a reference voltage signal DATA2 having a duty ratio of 20% corresponding to the data load ratio of 20% to the filter 612. Then, the filter 612 transfers a second voltage Vref having a value of 0.7 V to the comparator 606 according to the input reference voltage signal DATA2.

Since those skilled in the art easily understands that the value of the second voltage Vref output from the filter 612 is changed as the duty ratio of the input reference voltage signal DATA2 is changed, the description is omitted.

A method of controlling the power voltage supplier 50 by the second voltage Vref output from the filter 612 and the first voltage V1 output from the current voltage converter 602 is the same as described in FIG. 3.

Accordingly, the display device according to the exemplary embodiments illustrated in FIGS. 3 and 5 may control driving of the power voltage supplier 50 by comparing the first voltage V1 converted from the current flowing in the plurality of pixels and the second voltage Vref determined from the image information of one frame unit.

Next, a total current flowing in a defective pixel of the display unit 10 will be described with reference to FIGS. 7 and 8.

Figure 7:
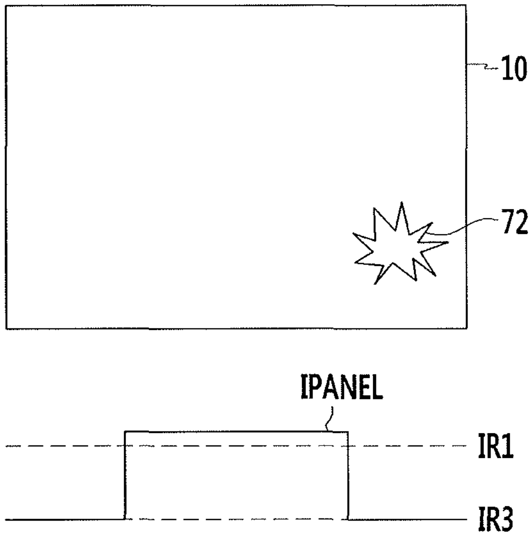
FIGS. 7 and 8 illustrate exemplary schematic diagrams of a current flowing in a display unit when a defect is generated in a pixel of the display device according to an exemplary embodiment.
Figure 8:
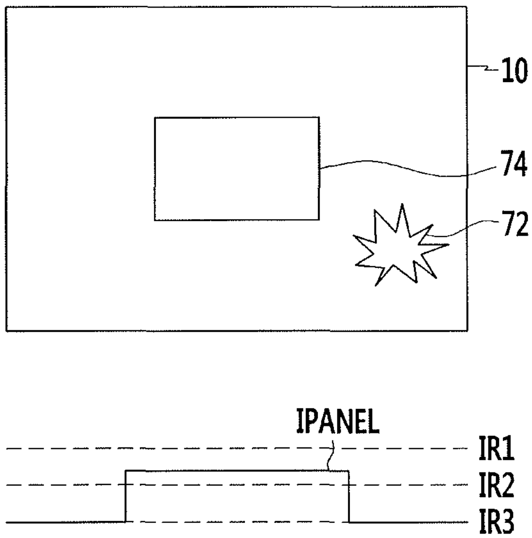

FIGS. 7 and 8 illustrate exemplary schematic diagrams of a total current IPANEL flowing in a display unit 10 when a defect is generated in a pixel of the display device according to an exemplary embodiment. Here, IR3 may be a minimum limiting current value of the total current.

First, FIG. 7 illustrates a diagram of a limiting current IR1 and a total current IPANEL. The limiting current IR1 is a limiting value of a current flowing in a plurality of pixels when all the pixels normally emit light.

The total current IPANEL exceeding the limiting current IR1 may flow in the plurality of pixels. When the total current IPANEL exceeds the limiting current IR1 by a defective pixel 72, the supply of the power voltage may stop to the plurality of pixels.

However, as illustrated in FIG. 8, when the number of pixels emitting light by the image information is reduced, the pixels emit light at a low gray level, or only the pixels positioned in a partial area 74 of the display unit 10 emit light, an overcurrent of the limiting current IR1 or less may be generated by the defective pixel 72.

Even when the overcurrent of a predetermined limiting current IR1 or less flows, the display unit 10 needs to be protected. When the limiting current is changed to IR2 and the total current IPANEL exceeds the limiting current IR2, the supply of the power voltage needs to stop to the plurality of pixels.

The limiting current IR2 is a virtual value which is a comparison reference of the total current IPANEL, and is a limiting value of a current which can flow in the plurality of pixels according to a data load ratio.

The display device described above determines the first voltage V1 into which the total current IPANEL is converted based on the second voltage Vref according to the data load ratio to stop driving of the power voltage supplier 50 and protect the display unit 10.

The display device does not directly compare the total current IPANEL and the limiting current IR2, but may compare the first voltage V1 and the second voltage Vref.

Accordingly, when the total current IPANEL exceeding the limiting current IR2 by the defect pixel 72 flows in the plurality of pixels, the driving control device and the display device including the driving control device may stop driving of the power voltage supplier 50, thereby preventing the exceeding current IPANEL from flowing in the pixels.

The display device according to the exemplary embodiment stops driving of the power voltage supplier 50 when the current flowing in the plurality of pixels exceeds the limiting current IR2 determined by the image information which is currently displayed, and as a result, the display device may be safely driven.

Embodiments have been made in an effort to provide a display device, a control device for driving a display device, and a control method thereof having advantages of limiting an abnormal current flowing in a pixel. Further, embodiments have been made in an effort to provide a display device, a control device for driving a display device, and a control method thereof having advantages of ensuring stability of the display device and easily detecting a defect pixel, by controlling power voltage supply by using image information due to a change of a current flowing in a pixel.

Effects of the display device according are as follows. According to at least one of the exemplary embodiments, safety of a display device may be improved by limiting an abnormal current flowing in a pixel.

In addition, according to at least one of the exemplary embodiments, supply of a power voltage to the pixel may be controlled according to image information.

Further, according to at least one of the exemplary embodiments, existence of a defective pixel may readily determined by stopping the power voltage supply.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:

a display unit including a plurality of pixels that emits light according to a plurality of data signals supplied through a plurality of data lines;

a power voltage supplier to supply a power voltage to the plurality of pixels;

a current detector to detect a total current flowing in the plurality of pixels; and a controller to receive image information of one frame unit, determine a data load ratio of the image information of one frame unit, and generate a reference voltage signal corresponding to the data load ratio of the image information of one frame unit, wherein the current detector is to compare the total current and the reference voltage signal and to control driving of the power voltage supplier according to the comparison, wherein the controller is to change the reference voltage signal based on changes in data load ratio of image information received for a plurality of frame units, and wherein the data load ratio is a ratio of the number of pixels emitting light and a gray level of each pixel emitting light according to the image information of one frame unit which is currently received based on a load when all of the plurality of pixels emit light at a maximum gray level.

2. The display device as claimed in claim 1, wherein the data load ratio is based on a ratio of a sum of maximum currents flowing in the plurality of pixels and a sum of currents flowing in the plurality of pixels by the image information of one frame unit.

3. The display device as claimed in claim 2, wherein the current detector includes:

a current-voltage converter to convert the total current into a first voltage;

a signal converter to convert a digital signal of the reference voltage signal into an analog signal having a second voltage value; and a comparator to compare the first voltage value and the second voltage value and to output a signal stopping driving of the power voltage supplier when the first voltage value exceeds the second voltage value.

4. The display device as claimed in claim 2, wherein the current detector includes:

a current-voltage converter to convert the total current into a first voltage;

a filter to output the reference voltage signal in a predetermined frequency section to a second voltage; and a comparator to compare the first voltage value and the output second voltage value and to output a signal stopping driving of the power voltage supplier when the first voltage exceeds the second voltage.

5. The display device as claimed in claim 4, wherein the controller is to generate the reference voltage signal having a duty ratio changed according to the data load ratio.

6. The display device as claimed in claim 4, wherein the controller is to determine the data load ratio as a plurality of sections and, when the determined data load ratio corresponds to a first section, the controller is to generate the reference voltage signal so that the second voltage corresponding to the first section is output to the comparator.

7. The display device as claimed in claim 1, wherein the currents flowing in the plurality of pixels are a sum of currents flowing in the plurality of pixels.

8. A driving control device for controlling driving of a power voltage supplier that supplies a power voltage to a plurality of pixels through a power wire connected to the plurality of pixels emitting light according to a plurality of data signals supplied through a plurality of data lines, the device comprising:

a current detector to detect a total current flowing in the plurality of pixels, to compare the total current and a reference voltage signal corresponding to image information of one frame, and to control driving of the power voltage supplier according to the comparing, wherein the current detector is to control driving of the power voltage supplier based on changes reference voltage signal, the reference voltage signal to change based on changes in data load ratio of image information received for a plurality of frames, wherein the data load ratio is a ratio of the number of pixels emitting light and a gray level of each pixel emitting light according to the image information of one frame which is currently received based on a load when all of the plurality of pixels emit light at a maximum gray level.

9. The driving control device as claimed in claim 8, wherein: the data load ratio is based on a ratio of a sum of maximum currents flowing in the plurality of pixels and a sum of currents flowing in the plurality of pixels by the image information of one frame unit.

10. The driving control device as claimed in claim 9, wherein the current detector includes:

a current-voltage converter to convert the total current into a first voltage;

a signal converter to convert a digital signal of the reference voltage signal into an analog signal having a second voltage value; and a comparator to compare the first voltage value and the second voltage value to output a signal stopping driving of the power voltage supplier.

11. The driving control device as claimed in claim 9, wherein the current detector includes:

a current-voltage converter to convert the total current into a first voltage;

a filter to output the reference voltage signal in a predetermined frequency section to a second voltage; and a comparator to compare the first voltage value and the output second voltage value to output a signal stopping driving of the power voltage supplier.

12. The driving control device as claimed in claim 11, wherein the reference voltage signal has different duty ratios according to the data load ratio.

13. The driving control device as claimed in claim 11, wherein the reference voltage signal is to output the second voltage value corresponding to a first section to the comparator when the data load ratio determined as a plurality of sections corresponds to the first section.

14. The driving control device as claimed in claim 9, wherein the currents flowing in the plurality of pixels are a sum of currents flowing in the plurality of pixels.

15. A control method of a display device, the method comprising:

detecting a total current flowing in a plurality of pixels;

receiving image information of one frame unit;

determining a data load ratio of the image information of one frame unit;

generating a reference voltage signal corresponding to the data load ratio of the image information of one frame unit; and stopping driving of a power voltage supplier which supplies a power voltage to the plurality of pixels according to a result acquired by comparing the total current and the generated reference voltage signal, the method further including changing the reference voltage signal based on changes in data load ratio of image information received for a plurality of frame units, wherein the data load ratio is a ratio of the number of pixels emitting light and a gray level of each pixel emitting light according to the image information of one frame unit which is currently received based on a load when all of the plurality of pixels emit light at a maximum gray level.

16. The control method of a display device as claimed in claim 15, wherein the data load ratio is determined based on a ratio of a sum of maximum currents flowing in the plurality of pixels and a sum of currents flowing in the plurality of pixels by the image information of one frame unit.

17. The control method of a display device as claimed in claim 16, wherein stopping driving of the power voltage supplier includes:

converting the total current into a first voltage;

converting a digital signal of the reference voltage signal into an analog signal having a second voltage value; and comparing the first voltage value and the second voltage value to stop driving the power voltage supplier when the first voltage value exceeds the second voltage value.

18. The control method of a display device as claimed in claim 16, wherein stopping driving of the power voltage supplier includes:

converting the total current into a first voltage;

outputting the reference voltage signal in a predetermined frequency section to a second voltage; and comparing the first voltage and the output second voltage to stop driving the power voltage supplier when the first voltage exceeds the second voltage.

19. The control method of a display device as claimed in claim 18, wherein the reference voltage signal has different duty ratios according to the data load ratio.

20. The control method of a display device as claimed in claim 18, wherein generating the reference voltage signal includes:

determining the data load ratio as a plurality of sections; and generating the reference voltage signal so that the second voltage corresponding to a first section is output, when the determined data load ratio corresponds to the first section.

21. The control method of a display device as claimed in claim 15, wherein the currents flowing in the plurality of pixels are a sum of currents flowing in the plurality of pixels.

* * * * *